Oct. 17, 1961     C. VAN DER LELY ET AL     3,004,379
DEVICE FOR THE LATERAL DISPLACEMENT OF
MATERIAL LYING ON THE GROUND
Filed Jan. 24, 1958
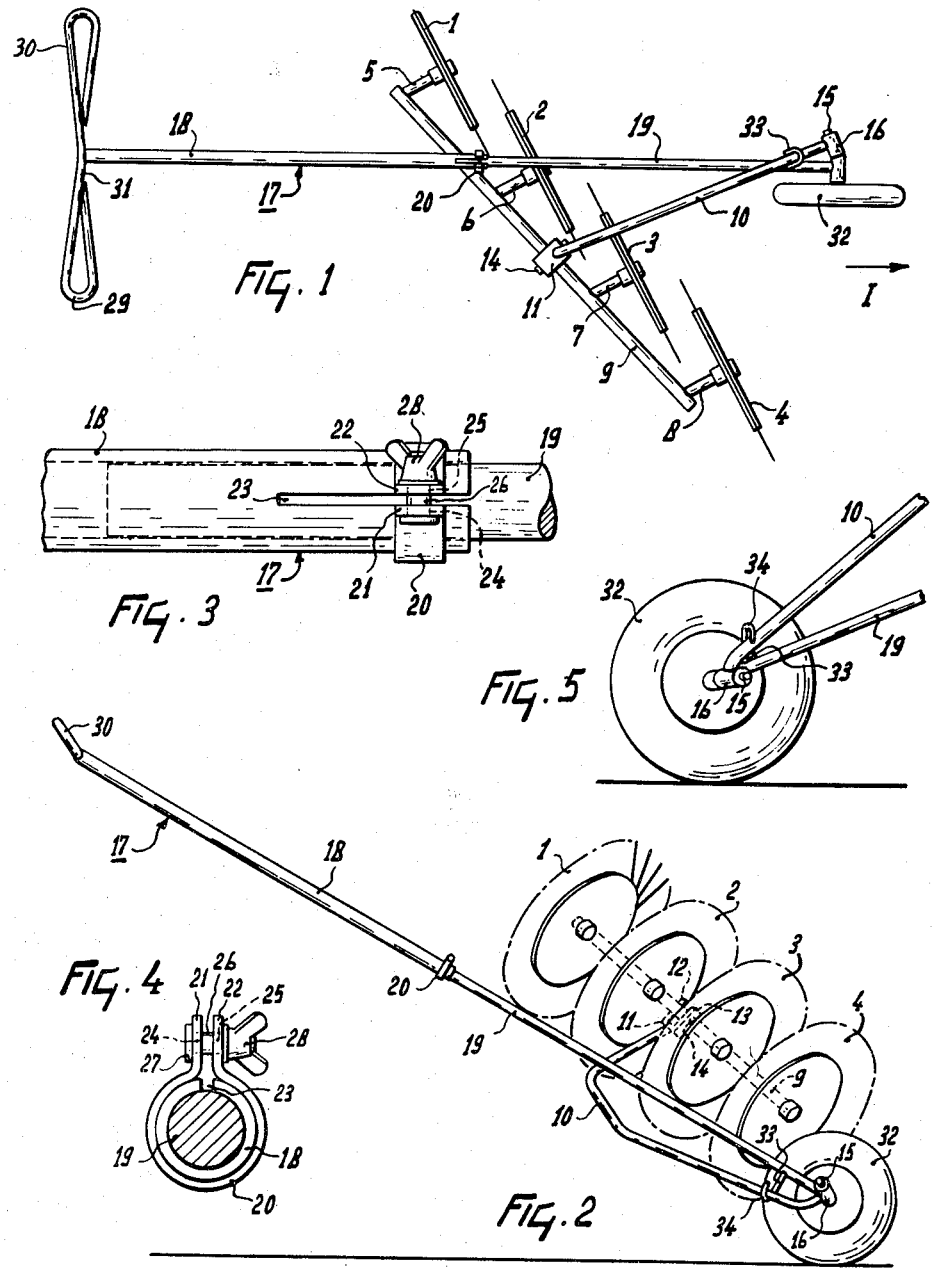
INVENTOR.
BY United States Patent Office 3,004,379
Patented Oct. 17, 1961

3,004,379
DEVICE FOR THE LATERAL DISPLACEMENT OF MATERIAL LYING ON THE GROUND
Cornelis van der Lely and Ary van der Lely, Maasland, Netherlands, assignors to C. van der Lely N.V., Maasland, Netherlands, a Dutch limited liability company
Filed Jan. 24, 1958, Ser. No. 711,053
Claims priority, application Netherlands Oct. 16, 1957
11 Claims. (Cl. 56—400.02)

The invention relates to a device for the lateral displacement of material lying on the ground, the device comprising a frame and a plurality of rake wheels. Devices of this kind, which are generally known, often comprise more than one running wheel and a fastening member, by which the device can be coupled with a vehicle drawing the device, which vehicle is moved by motive force, these devices being employed usually for harvesting agricultural crops.

The invention has for its object to provide a simple and cheap device of the aforesaid kind, which serves mainly to displace aside the material on lawns and the like. In accordance with the invention this may be achieved to adapt the frame to be movable by one person, to which end the frame is provided with a handle, on which the person can exert the force required to move the devcie, which is provided with only one running wheel.

An advantageous embodiment of the device according to the invention is obtained by connecting the frame beam, on which the rake wheels are arranged, with the frame portion whch constitutes the connection between the handle and the running wheel, by means of a second frame beam, whilst a supporting member provided on the frame portion extends over the second frame beam, so that the device can be changed over into a transport position by turning the frame portion through 180°, the second frame beam then bearing on the supporting member.

In accordance with the invention an advantageous form of a device for working the material lying on a lawn or the like may furthermore be obtained by adapting the device to be movable by one person, to which end the frame is provided with a handle, on which the force required for moving the device can be exerted by the person, whilst the rake wheels are connected with the frame by means of cranks, which are rotatable with respect to the frame, so that the rake wheels can readily match any unevennesses of the ground. In certain cases, when the frame is supported by two running wheels, a satisfactory alignment of these wheels is ensured by arranging their axes of rotation parallel to each other.

The invention relates furthermore to a device for the lateral displacement of crop lying on the ground, the device comprising a frame and a plurality of rake wheels, which are arranged on a frame beam, which is pivoted to the frame, the pivotal joint of the frame beam with the frame being located at a distance over the ground which is smaller than 0.4 of the diameter of a rake wheel. By arranging the pivotal joint at such a low level, the rake wheels will be slightly lifted from the ground by turning about the said pivotal joint in the event of a harmful load, for example when they pass over unevennesses of the ground, for instance lumps of stone or the like, so that damage to the rake wheels is avoided.

The invention will be described more fully with reference to the drawing, which shows a few advantageous embodiments.

FIG. 1 is a plan view of a first embodiment of the invention.

FIG. 2 is a side elevation of the device shown in FIG. 1 in an inoperative position.

FIG. 3 shows, on an enlarged scale, a plan view of a detail of the device shown in FIG. 1.

FIG. 4 is an enlarged elevational view of the detail shown in FIG. 3.

FIG. 5 is a side elevational view of a detail of the device shown in FIG. 1.

According to the FIGS. 1 to 5 the device of the invention comprises four rake wheels 1, 2, 3 and 4, which are freely rotatable about axles 5, 6, 7 and 8, which are rigidly secured to a frame beam 9, which is pivoted to a second frame beam 10. The frame beam 10 is provided at one end with a fork or pivot means 11, which has two limbs 12 and 13, between which the frame beam 9 is arranged and to which the frame beam 10 is secured by means of a shaft 14. The other end of the frame beam 10 is provided with a bearing 16, which is rotatably journalled on a shaft 15, which is provided on a mobile frame or beam 17. The beam 17 consists of a thin, rod-shaped portion 19 and a larger, tubular portion 18, in which the portion 19 is arranged so as to be slidable therein. In order to fix the portions 19 and 18 in different relative positions, the lower end of the portion 18 is provided with a ring 20, which has two upright lugs 21 and 22, which are slightly spaced apart. The lower end of the tube 18, about which the ring 20 is provided, is provided with a slot 23, which is located between the lugs 21 and 22. The portion 19 can be clamped tight in the tube 18 by drawing to each other the lugs 21 and 22. To this end the lugs 21 and 22 are provided with holes 24 and 25, through which a bolt 26 is passed. The bolt 26 is provided at one end with a head 27, which engages the lug 21, to which it is welded, whereas the other end of the bolt 26 is provided with a thread, on which is screwed a winged nut 28. By turning the winged nut 28 in one direction, the lugs 21 and 22 can be moved towards each other, so that the rod 19 is clamped tight in the tube 18 and by turning the winged nut 28 in the other directon, so that the lugs 21 and 22 move away one from the other, the clamping of the rod 19 in the tube 18 can be loosened. The tube 18 is provided at the upper end with two handles 29 and 30, which are formed in a simple manner by bending the ends of a rod 31 provided at the end of the tube 18. The lower end of the rod 19 is provided with a running wheel 32 and near the lower end rod 19 is moreover provided with a supporting member 33, which has a curved end 34. The supporting member 33 is arranged on the rod 19 in a manner such that part thereof, i.e. the curved end 34 is located exactly over the frame beam 10, which extends from the bearing 15 over the frame beam 17 towards the frame beam 9. Owing to the provision of the supporting member 33 the device can be moved in a simple manner into a transport position, by turning through 180° about its longitudinal axis or about the rotary axis of the running wheel 32 the frame portion which connects the handles 29 and 30 with the running wheel 32 and which is constituted by the beam 17.

When the device is used, which is simple since the frame consists of not more than three frame beams and has only one running wheel, it is moved in the direction I, the force required for this movement being exerted by a person on the handles 29 and 30. When the device moves in the direction I, the rake wheels 1, 2, 3 and 4 will cooperatively displace laterally the material lying on the ground. Since the rake wheels 1 to 4, arranged on the frame beam 9, are pivoted to the beam 17 with the aid of the shaft 14 and the bearing 16, they can readily accommodate any irregularities of the ground by pivotal movement. Owing to the pivotal connection of the rake wheels with the beam 17, the rake wheels, when moving, will transfer their own weight and the weight of the frame beams 9 and 10 to the ground, whereas the weight of the beam 17 is supported partly by the running wheel 32 and partly by the person holding the handles.

The slidability of the rod 19 in the tube 18 serves to obtain an adjustment of the height of the handles 29 and 30 over the ground and to obtain a compact structure when the device has to be stowed away, so that it can be accommodated readily in a small storage space.

In order to lift slightly the rake wheels, if desired, when varying the direction of the device, it suffices to lift the handles 29 and 30 slightly; thus the frame beam 10 will bear on the rod 19, which thus limits rotation of the frame beam 10 in one direction, so that the rake wheels 1 to 4 can be lifted from the ground. If the device is to be transported over a larger distance, the rake wheels are preferably lifted free of the ground by turning the frame through 180°. Then, as is evident from FIG. 2, the rod 10 will move into the curvature 34 of the supporting member 33. In this transport position the handles 29 and 30 can be held at the normal level of the hand of the person who moves the device.

What we claim is:

1. A hand-operated lawn rake for laterally displacing material lying on the ground comprising a mobile frame, consisting of one beam, one running wheel on and supporting the beam, said beam being pivotal on said running wheel through an angle of 180 degrees at the most, handles on the beam for manually propelling the device, a frame beam, at least one rake wheel on said frame beam for engagement with the ground, a second frame beam pivotal at one end on the mobile frame adjacent said running wheel and connecting the first said frame beam with said mobile frame, and supporting means on said mobile frame and engaging said second frame beam and adapted for limiting relative movement between said mobile frame and second frame beam.

2. A rake as claimed in claim 1 comprising a shaft on said mobile frame and wherein the second said frame beam is pivotally coupled to the shaft on said mobile frame.

3. A rake as claimed in claim 1 comprising pivot means coupling the first said frame beam to said second frame beam and defining at least one pivot axis.

4. A rake as claimed in claim 1 wherein said frame comprises two tubes, one slidable within the other, and means on and fastening the tubes togeher.

5. A rake as claimed in claim 1 comprising a plurality of rake wheels and axles supporting the rake wheels on the frame beam.

6. A rake as claimed in claim 1 wherein the frame beams cooperatively define an acute angle.

7. A rake as claimed in claim 1 wherein said rake wheel includes a plurality of tine members.

8. A rake as claimed in claim 1 wherein said frame is a straight tube.

9. A rake as claimed in claim 1 wherein said frame includes a straight tube and the running wheel is parallel to said tube, said device further comprising an axle supporting the running wheel on the tube.

10. A rake as claimed in claim 1 wherein the frame, running wheel and frame beams are pivoted on substantially the same axis.

11. A rake as claimed in claim 1 wherein the rake wheel is oblique to the direction of travel of said device.

References Cited in the file of this patent
UNITED STATES PATENTS

| | | |
|---|---|---|
| 1,806,480 | Manko | May 19, 1931 |
| 2,889,678 | Van der Lely | June 9, 1959 |

FOREIGN PATENTS

| | | |
|---|---|---|
| 784,312 | Great Britain | Oct. 9, 1957 |